3,068,193
ESTERS OF EPOXY FATTY ACIDS AND 2,4-DIHYDROXY BENZOPHENONE
Carl B. Havens, Midland, and Ronald G. Brookens, Auburn, Mich., assignors to The Dow Chemical Company, Midland, Mich., a corporation of Delaware
No Drawing. Filed Jan. 19, 1960, Ser. No. 3,267
5 Claims. (Cl. 260—45.8)

This invention relates to new organic compounds and to polymeric compositions containing the same. More particularly, it relates to esters of epoxy fatty acids and 2,4-dihydroxy benzophenone and to polymeric compositions stabilized with the same.

Many polymers, particularly vinyl polymers, are subject to rapid and severe degradation and consequent discoloration upon exposure to heat or to sunlight. To overcome these disadvantages, it has been found necessary to incorporate certain additives into compositions containing such polymers. Various compounds have been known to have utility as light stabilizers in such compositions. Several of those compounds, however, are odoriferous and volatile. Any odor in the stabilizer will be transferred to the stabilized composition thus greatly reducing the merchandisability of any article prepared from the composition. Also, a volatile ingredient in a polymeric composition will gradually volatilize out of the composition, leaving the composition unprotected. Other compounds are colored materials which impart an objectionable initial color to the stabilized composition and thus prevent the production of a commercially salable white composition.

Such compounds vary in their effectiveness for absorbing ultraviolet light or as heat stabilizers and vary in their compatibility with the polymer employed in the composition. Thus, it is impossible to predict the effectiveness of any particular compound as a light or heat stabilizer for any given polymer.

It is accordingly the principal object of this invention to provide a new group of organic compounds having the stated utility.

Another object of the invention is to provide a new group of organic compounds which are fungicidal and hence are useful as pesticides.

It is a further object to provide a polymeric composition stabilized against the degradative effects of heat and light by means of such compounds.

Other objects are to provide a group of such compounds which have little or no color, a low odor level and low volatility.

The above and related objects are accomplished by means of 4-mono esters of 2,4-dihydroxy benzophenone and epoxy fatty acids having the following general formula:

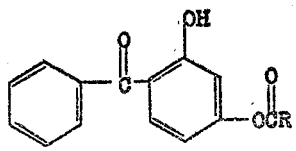

wherein R is an epoxy-containing aliphatic group containing from 1 to 3 epoxy groups and from 5 to 17 carbon atoms. The invention likewise includes stabilized compositions comprising such compounds and organic synthetic polymeric materials normally subject to degradation on exposure to light and heat.

As typical examples of the compounds which are within the scope of the invention may be mentioned:

9,10,12,13-diepoxy octadecanoic acid;
2,4-dihydroxy benzophenone, 4-mono ester 2,3,4,5-diepoxy hexanoic acid;
2,4-dihydroxybenzophenone, 4-mono ester 9,10-epoxy octadecanoic acid;
2,4-dihydroxy benzophenone, 4-mono ester 9,10,12,13,15,16-triepoxy octadecanoic acid;
2,4-dihydroxy benzophenone, 4-mono ester The esters are prepared by the reaction of 4-benzoyl resorcinol with an unsaturated fatty acid chloride and the subsequent epoxidation of the resulting 4-mono ester of 2,4-dihydroxy benzophenone to the epoxy ester. As a typical example of their preparation, the procedure for preparing 9,10,12,13-diepoxy octadecanoic acid; 2,4-dihydroxy benzophenone, 4-mono ester will be described. A reaction mixture consisting of 149.3 grams of linoleic acid chloride, 107 grams of 4-benzoyl resorcinol in 500 ml. toluene and 75 ml. pyridine was heated for two hours at 75–80° C. After successive washing with dilute HCl, 5.0 percent sodium bicarbonate and water, the solvent was removed by distillation under a reduced pressure of 30–35 mm. Hg. To 71.4 grams of the product, 9,12-octadecadienoic acid; 2,4-dihydroxy benzophenone, 4-mono ester, was added slowly over a 40-minute period 30.5 grams of 40 percent aqueous peracetic acid which had been buffered with two grams of sodium acetate to remove mineral acids present. The reaction mixture was maintained at a temperature below 20° C. during the addition of the peracetic acid. The reaction mixture was then permitted to stand for three hours at 20 to 25° C., poured into cold water, filtered off, dissolved in ethyl ether and washed twice with water. Upon evaporation of the ether, a light yellow viscous liquid having an iodine No. of 35.9 was obtained. Other esters within the scope of the above general formula may be prepared by choosing the desired unsaturated fatty acid chloride, conducting the reaction in solvents in the presence of esterification catalysts and epoxidation of the resulting unsaturated fatty acid 4-mono ester with a peroxide-liberating material.

The compounds were effective fungicides useful for the control of plant diseases.

The compounds were also evaluated as heat and light stabilizers for haloethylene and other polymers. Because of their low odor level and light color, they produced compositions which were more merchandisable than compositions prepared from the previous stabilizers. In addition, their low volatility caused a more permanent stabilization than prior compounds.

As light and heat stabilizers, the compounds may be employed in an amount of from 0.5 to 10 percent by weight based on the weight of the polymer employed. It is possible to use the compounds in conjunction with other known stabilizers.

The compounds of this invention have been found to be particularly effective in stabilizing polymers and copolymers of vinylidene chloride. They have also been found effective in stabilizing polyesters, polyamides, polyolefins and polyacrylonitriles against the degradative effects of heat and light.

The effectiveness of the stabilizing compounds of this invention will be more apparent from the following illustrative examples in which all parts and percentages are by weight.

Example 1

A series of samples was prepared from a basic formulation consisting of 91.5 parts of a copolymer prepared from 85 percent vinylidene chloride and 15 percent vinyl chloride, 7 parts of a pentaerythritol tetraester of saturated fatty acids having 8–10 carbon atoms, sold commercially as J–15 by the Hercules Powder Company, as a plasticizer, 0.5 part of disodium lauryl phosphate, 0.5 part of sodium tripolyphosphate and 0.5 part of sorbitan monostearate. One group of samples was left as blanks for comparison. To another group of samples was added one part of 9,10,12,13-diepoxy octadecanoic acid; 2,4-dihydroxy benzophenone, 4-mono ester. The samples were compression molded to form sheets 0.005 inch thick. The moldings were exposed under General Electric RS1 sunlamps. The extent of browning was rated according to color standards ranging from 0 (no browning) to 12 (dark brown). The hours of useful life based on the time required to reach a standard color change of 6 was determined. The results are listed in the following table.

| Compound: | Hours of useful life |
|---|---|
| 9,10,12,13-diepoxy octadecanoic acid; 2,4-dihydroxy benzophenone, 4-mono ester | 32 |
| Blank | 16 |

Example II

A concentration of 1 percent of 9,10,12,13-diepoxy octadecanoic acid; 2,4-dihydroxy benzophenone, 4-mono ester was incorporated into a base polymer formulation of the following composition: a copolymer prepared from 85 percent vinylidene chloride and 15 percent vinyl chloride containing 7 percent of pentaerythritol tetraester of saturated fatty acids having 8 to 10 carbon atoms, 0.5 percent of disodium lauryl phosphate, 0.5 percent sodium tripolyphosphate, and 0.5 percent of sorbitan monostearate. Compression moldings were exposed in a 150° C. circulating air oven. The extent of browning was rated according to color standards ranging from 0 (no browning) to 12 (dark brown).

| Compound: | hrs. in a 150° C. oven hrs. in a 160° C. oven |
|---|---|
| Control | 6.0 |
| Octadecanoic acid: 9,10,12,13-diepoxy-, 2,4-dihydroxy benzophenone, 4-monoester | 3.5 |

Example III

A concentration of 2 percent of 9,10,12,13-diepoxy octadecanoic acid; 2,4-dihydroxy benzophenone was incorporated in Polylite 8181, a glycol unsaturated polyester resin. The mixture was poured between two glass plates equipped with a gasket for spacing purposes. The plates were clamped together and heated to 70° C. for 12 hours followed by an additional five-hour heating period at 150° C. A control sample without the addition of the stabilizer was similarly prepared. The percent light transmission at 436 mu of both samples was obtained by a photometer and the samples were then exposed under a sunlamp for 672 hours. The percent transmission of the exposed samples was again determined at 436 mu. The results are set forth in the following table:

| | Percent retention of transmission |
|---|---|
| Control | 81.6 |
| Stabilized resin | 98.5 |

It can be seen that the compounds of this invention are effective to prevent degradation and discoloration of polymeric compositions by light and heat.

Additional thermoplastic polymeric compositions stabilized with the compounds of the invention are illustrated by the following examples:

Example IV

| Poly(hexamethylene adipamide) | 98.0 |
|---|---|
| 2,3,4,5-diepoxy hexanoic acid; 2,4-dihydroxy benzophenone 4-mono ester | 2.0 |

Example V

| Polystyrene | 98.5 |
|---|---|
| 9,10-epoxy octadecanoic acid; 2,4-dihydroxy benzophenone 4-mono ester | 1.5 |

Example VI

| Polyvinyl chloride | 99.0 |
|---|---|
| 9,10,12,13,15,16-triepoxy octadecanoic acid; 2,4-dihydroxy benzophenone, 4-mono ester | 1.0 |

The compositions of Examples IV–VI exhibited much greater stability against discoloration by ultraviolet light and heat than did the unstabilized polymers.

We claim:

1. As a new organic compound, a 4-mono ester of 2,4-dihydroxy benzophenone and an epoxy fatty acid having the general formula:

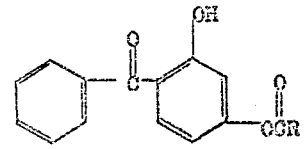

wherein R is an epoxy-containing aliphatic group containing from 1 to 3 epoxy groups and from 5 to 17 carbon atoms.

2. The 4-mono ester of 2,4-dihydroxy benzophenone and 9,10,12,13-diepoxy octadecanoic acid.

3. A composition comprising an organic synthetic polymeric material normally subject to degradation on exposure to light and heat selected from the group consisting of haloethylene, styrene, polyamide, and unsaturated polyester polymers and from 0.5 to 10 percent of weight of said polymeric material of a 4-mono ester of 2,4-dihydroxy benzophenone and an epoxy fatty acid having the general formula:

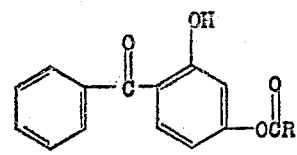

wherein R is an epoxy-containing aliphatic group containing from 1 to 3 epoxy groups and from 5 to 17 carbon atoms.

4. The composition claimed in claim 3 wherein the polymeric material is a haloethylene polymer.

5. A composition comprising a haloethylene polymer and from 0.5 to 10 percent of the weight of said polymer of the 4-mono ester of 2,4-dihydroxy benzophenone and 9,10,12,13-diepoxy octadecanoic acid.

References Cited in the file of this patent

UNITED STATES PATENTS

| 2,887,459 | Carmody | May 19, 1959 |
| 2,894,022 | Havens et al. | July 7, 1959 |
| 2,898,323 | Clark | Aug. 4, 1959 |
| 2,938,883 | Raich | May 31, 1960 |
| 2,980,647 | Lappin | Apr. 18, 1961 |

UNITED STATES PATENT OFFICE
CERTIFICATE OF CORRECTION

Patent No. 3,068,193  December 11, 1962

Carl B. Havens et al.

It is hereby certified that error appears in the above numbered patent requiring correction and that the said Letters Patent should read as corrected below.

Column 3, lines 33 and 34, for hrs. in a 150° C. oven
    hrs. in a 160° C. oven read color change following
    4 hrs. in a 150° C. oven (SEAL)  Signed and sealed this 23rd day of July 1963.
Attest:

ERNEST W. SWIDER  DAVID L. LADD
Attesting Officer  Commissioner of Patents